US012634780B2

(12) United States Patent
Park et al.

(10) Patent No.: US 12,634,780 B2
(45) Date of Patent: May 19, 2026

(54) SWITCH GAP CONFIGURATION TRANSPORT BETWEEN BASE STATIONS IN WIRELESS NETWORKS

(71) Applicant: SHARP KABUSHIKI KAISHA, Osaka (JP)

(72) Inventors: Kenneth James Park, Vancouver, WA (US); Atsushi Ishii, Vancouver, WA (US)

(73) Assignee: SHARP KABUSHIKI KAISHA, Sakai City (JP)

( * ) Notice: Subject to any disclaimer, the term of this patent is extended or adjusted under 35 U.S.C. 154(b) by 292 days.

(21) Appl. No.: 18/684,868

(22) PCT Filed: Jul. 21, 2022

(86) PCT No.: PCT/JP2022/028294

§ 371 (c)(1),
(2) Date: Feb. 20, 2024

(87) PCT Pub. No.: WO2023/032502

PCT Pub. Date: Mar. 9, 2023

(65) Prior Publication Data

US 2024/0349146 A1      Oct. 17, 2024

Related U.S. Application Data

(60) Provisional application No. 63/239,363, filed on Aug. 31, 2021.

(51) Int. Cl.
*H04W 36/08*        (2009.01)
*H04W 36/00*        (2009.01)
*H04W 76/20*        (2018.01)

(52) U.S. Cl.
CPC .................. *H04W 36/0088* (2013.01); *H04W 36/008357* (2023.05); *H04W 76/20* (2018.02); *H04W 36/0064* (2023.05); *H04W 36/08* (2013.01)

(58) Field of Classification Search
CPC ..... H04W 36/0064; H04W 36/008357; H04W 36/0088; H04W 36/08; H04W 76/20; H04W 8/183; H04W 92/20
(Continued)

(56) References Cited

U.S. PATENT DOCUMENTS 12,328,782 B2 *    6/2025  Jung ................. H04W 72/0446
2023/0345332 A1 * 10/2023  Wang ................. H04W 36/144
(Continued)

OTHER PUBLICATIONS

ETSI MCC, "Report of 3GPP TSG RAN WG2 meeting #114-e, Online", R2-2106901, 3GPP TSG-RAN WG2 meeting #115-e, May 19-27, 2021.
(Continued)

*Primary Examiner* — Robert J Lopata
(74) *Attorney, Agent, or Firm* — ScienBiziP, P.C.

(57) ABSTRACT

A method for a user equipment (UE) is provided. The method includes the UE maintaining a first Radio Resource Control (RRC) connection with a first base station (BS) of a first network while receiving transmissions from a BS of a second network during at least one time period specified in a switch gap configuration. The UE receives an RRC reconfiguration message from the first BS that includes a first command and a second command. The first command instructs the CE to begin a handover procedure from the first BS to a second BS of the first network. The UE may initiate executing of the handover procedure according to the first command. The UE may or may not continue to receive transmissions from the BS of the second network during the at least one time period based on the second command.

15 Claims, 9 Drawing Sheets

(58) Field of Classification Search
USPC ........................................................ 370/329
See application file for complete search history.

(56) References Cited

U.S. PATENT DOCUMENTS

| 2024/0073765 | A1* | 2/2024 | Shrivastava | ...... | H04W 36/0072 |
| 2024/0107409 | A1* | 3/2024 | Da Silva | ........... | H04W 36/0033 |
| 2024/0215101 | A1* | 6/2024 | Gurumoorthy | ....... | H04W 8/183 |
| 2024/0260121 | A1* | 8/2024 | Bae | ....................... | H04W 76/15 |

OTHER PUBLICATIONS

Vice Chairman (Nokia), "Report on LTE legacy, 71 GHz, DCCA, Multi-SIM and RAN slicing", R2-2108831, 3GPP TSG-RAN WG2 Meeting #115 electronic, Online, Aug. 2021.

ETSI MCC, "Report of 3GPP TSG RAN WG2 meeting #113bis-e, Online", R2-2106641, 3GPP TSG-RAN WG2 meeting #114-e, Apr. 12-20, 2021.

ETSI MCC, "Report of 3GPP TSG RAN WG2 meeting #113-e, Online", R2-2102601, 3GPP TSG-RAN WG2 meeting #113bis-e, Jan. 25,-Feb. 5, 2021.

* cited by examiner

Signaling of command to configure the Switching Procedure for continued use of the *Currently Jointly In Use* Switch Gap Configuration(s) during and after the handover to gNB-2-NW-1

Signaling of command to configure the Switching Procedure for stop use of the *Currently Jointly In Use* Switch Gap Configuration(s) during and after the handover to gNB-2-NW-1

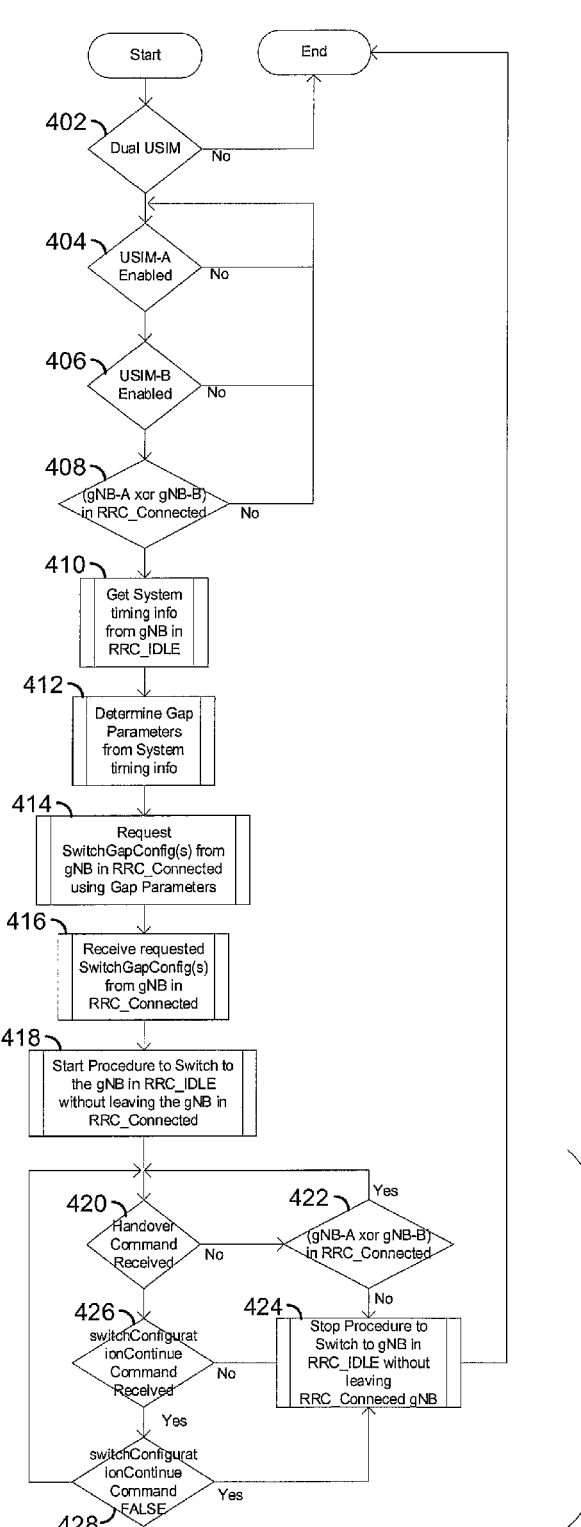

400

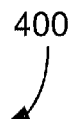

Note: The logic here provides that if the Handover command did NOT ALSO contain a SwitchConfigurationContinue command, then the Switch Procedure is not allowed to continue. If however, if the Handover command did contain a SwitchConfigurationContinue command, and that command is TRUE then the Switch Procedure is allowed to continue, else the Switch Procedure is not allowed to continue..

```
-- ASN1START
-- TAG-OTHERCONFIG-START

OtherConfig ::=                     SEQUENCE {
    delayBudgetReportingConfig      CHOICE{
        release                     NULL,
        setup                       SEQUENCE{
            delayBudgetReportingProhibitTimer    ENUMERATED (s0, s0dot4, s0dot8, s1dot6, s3, s6, s12, s30)

}
    }                               OPTIONAL                 -- Need M

}

OtherConfig-v1540 ::=               SEQUENCE {
    overheatingAssistanceConfig     SetupRelease (OverheatingAssistanceConfig}   OPTIONAL,  -- Need M
    ...
}

CandidateServingFreqListNR-r16 ::= SEQUENCE (SIZE (1..maxFreqIDC-r16)) OF ARFCN-ValueNR OtherConfig-v1610 ::=               SEQUENCE {
    idc-AssistanceConfig-r16            SetupRelease {IDC-AssistanceConfig-r16}          OPTIONAL,   -- Need M
    drx-PreferenceConfig-r16            SetupRelease (DRX-PreferenceConfig-r16)          OPTIONAL,   -- Need M
    maxBW-PreferenceConfig-r16          SetupRelease {MaxBW-PreferenceConfig-r16}        OPTIONAL,   -- Need M
    maxCC-PreferenceConfig-r16          SetupRelease {MaxCC-PreferenceConfig-r16}        OPTIONAL,   -- Need M
    maxMIMO-LayerPreferenceConfig-r16   SetupRelease {MaxMIMO-LayerPreferenceConfig-r16} OPTIONAL,   -- Need M
    minSchedulingOffsetPreferenceConfig-r16 SetupRelease {MinSchedulingOffsetPreferenceConfig-r16}  OPTIONAL,   -- Need M
    releasePreferenceConfig-r16         SetupRelease (ReleasePreferenceConfig-r16}       OPTIONAL,   -- Need M
    referenceTimePreferenceReporting-r16    ENUMERATED (true)                            OPTIONAL,   -- Need R
    btNameList-r16                      SetupRelease (BT-NameList-r16}                   OPTIONAL,   -- Need M
    wlanNameList-r16                    SetupRelease (WLAN-NameList-r16)                 OPTIONAL,   -- Need M
    sensorNameList-r16                  SetupRelease (Sensor-NameList-r16}               OPTIONAL,   -- Need M
    obtainCommonLocation-r16            ENUMERATED (true}                                OPTIONAL,   -- Need R
    sl-AssistanceConfigNR-r16           ENUMERATED{true}                                 OPTIONAL    -- Need R
}

OtherConfig-v1700 ::=               SEQUENCE {
    switchConfigurationContinue-r17     ENUMERATED{true}                                 OPTIONAL    -- Need R
    ...
}

......Note: remaining text omitted for brevity......

}

-- TAG-OTHERCONFIG-STOP
-- ASN1STOP
```

```
RRCReconfiguration-v1610-IEs ::=    SEQUENCE {
    otherConfig-v1610                   OtherConfig-v1610                                                   OPTIONAL,    -- Need M
    bap-Config-r16                      SetupRelease { BAP-Config-r16 }                                     OPTIONAL,    -- Need M
    iab-IP-AddressConfigurationList-r16 IAB-IP-AddressConfigurationList-r16                                 OPTIONAL,    -- Need M
    conditionalReconfiguration-r16      ConditionalReconfiguration-r16                                      OPTIONAL,    -- Need M
    daps-SourceRelease-r16              ENUMERATED(true)                                                    OPTIONAL,    -- Need N
    t316-r16                            SetupRelease {T316-r16}                                              OPTIONAL,    -- Need M
    needForGapsConfigNR-r16             SetupRelease {NeedForGapsConfigNR-r16}                               OPTIONAL,    -- Need M
    onDemandSIB-Request-r16             SetupRelease { OnDemandSIB-Request-r16 }                             OPTIONAL,    -- Need M
    dedicatedPosSysInfoDelivery-r16     OCTET STRING (CONTAINING PosSystemInformation-r16-IEs)              OPTIONAL,    -- Need N
    sl-ConfigDedicatedNR-r16            SetupRelease {SL-ConfigDedicatedNR-r16}                              OPTIONAL,    -- Need M
    sl-ConfigDedicatedEUTRA-Info-r16    SetupRelease {SL-ConfigDedicatedEUTRA-Info-r16}                     OPTIONAL,    -- Need M
    targetCellSMTC-SCG-r16              SSB-MTC                                                              OPTIONAL,    -- Need S
    nonCriticalExtension                RRCReconfiguration-v1700-IEs                                        OPTIONAL
}

RRCReconfiguration-v1700-IEs    ::=    SEQUENCE {
    otherConfig-v1700                   OtherConfig-v1700                                                   OPTIONAL,    -- Need N
    nonCriticalExtension                SEQUENCE {}                                                         OPTIONAL
}

......Note: remaining text omitted for brevity......

-- TAG-RRCRECONFIGURATION-STOP
-- ASN1STOP
```

FIG. 8B

SWITCH GAP CONFIGURATION TRANSPORT BETWEEN BASE STATIONS IN WIRELESS NETWORKS

CROSS REFERENCE

This Nonprovisional application claims priority under 35 U.S.C. § 119 on provisional Application No. 63/239,363 on Aug. 31, 2021, the entire contents of which are hereby incorporated by reference.

TECHNICAL FIELD

The present disclosure generally relates to wireless communications and more specifically relates to transporting switch gap configuration information between base stations (e.g., Next Generation NodeBs (gNBs)) of a wireless network (e.g., a fifth generation (5G) (e.g., New Radio (NR)) network).

BACKGROUND ART

As employed on a mobile telephony device (e.g., mobile phone, satellite phone, smart watch, computer, camera, and so on), a Subscriber Identity Module (SIM) card is an integrated circuit running a Card Operating System (COS) that is intended to securely store the International Mobile Subscriber Identity (IMSI) number and its related encryption key for the device. This number and key are used to identify and authenticate the associated subscriber of a mobile communication network supporting the device.

A Universal Subscriber Identity Module (USIM) is the functional equivalent of a SIM in that it stores subscriber-related information. Additionally, a USIM operates as a miniature computer that may handle several miniature applications, such as the implementation of enhanced security functions pertaining to authentication and ciphering on the user side in mobile telephony devices.

In some cases, a mobile telephony device, which may be more generally referred to as a user equipment (UE), may be a multiple-USIM (Multi-USIM or MUSIM) device. In the consumer market, some commercially deployed UEs support a configuration with more than one USIM (e.g., typically two USIMs) that may be associated with the same or different networks. Support for a MUSIM device is conventionally handled in an implementation-specific manner without any support from 3rd Generation Partnership Project (3GPP) specifications, resulting in a variety of implementations. An implementation-specific MUSIM device typically uses common radio and baseband components that are shared among the multiple USIMs and under the control of a single processor, which may lead to issues that negatively impact 3GPP system performance.

For example, while actively communicating with a first network associated with a first USIM (USIM-A), the UE may occasionally check a second network associated with a second USIM (USIM-B) (e.g., to monitor the paging channel, detect a Synchronization Signal Block (SSB), perform signal measurements, or read system information) and decide if the UE should respond to a paging request from the other system. This occasional activity on the second network may or may not have any performance impact, depending on the UE implementation.

Paging Occasions (POs) are typically calculated based on the UE identifier (e.g., IMSI and 5G Serving Temporary Mobile Subscriber Identity (5G-S-TMSI) for Evolved Packet System (EPS) and 5G System (5GS), respectively).

In some cases, the UE identifier values associated with the different USIMs may lead to systematic collisions that may result in missed pages (e.g., a page on the first network associated with USIM-A occurs at, or nearly at, the same time as a page on the second network associated with USIM-B).

Further, when the UE receives a page on the second network, the UE may be configured to decide whether to respond to the page (e.g., by following user-configured rules). In the absence of information indicating the service type that triggered the paging (e.g., voice or data service), the UE may have to blindly decide whether to ignore or respond to the page.

Thereafter, in cases in which the UE decides to respond to the page in the second network, or when the UE is required to perform some signaling activity in the second network (e.g., Periodic Mobility Registration Update), the UE may be required to stop its current activity in the first network. In the absence of any procedure for suspension of the ongoing activity, the UE may autonomously release the Radio Resource Control (RRC) connection with the first network and abruptly leave. Such release is likely to be interpreted by the first network as an error case, which may distort connection statistics in the first network and thus misguide algorithms that rely on the statistics. Moreover, during the UE's absence, the first network will keep paging the UE, which will result in waste of paging resources.

Currently, the 3GPP is addressing the functionality of a Multi-USIM device as the functionality pertains to the coordinated operation of the device in and with a 3GPP network. As such functionality will impact physical layer, radio protocol, and radio architecture enhancements, as well as Service and System Aspects (SAs), the issue is being addressed in the 3GPP Technical Specification Group (TSG) SA Working Group 1 (WG1) (referred to as SA1), 3GPP TSG SA WG2 (SA2), and 3GPP TSG RAN WG2 (RAN2) working groups.

As a result of this work, in some proposals a UE may be configured to switch its communication resources from a first network to a second network (referred to as "network switching" or more simply "switching") to facilitate MUSIM functionality. When switching from a first network to a second network, the UE may tune its receiver/transmitter away from the time and frequency resources associated with the first network to the time and frequency resources associated with the second network. Switching functionality may be enabled by a configuration of the UE, where the UE may access the time and frequency resources of the first network as associated with a first USIM and the time and frequency resources of the second network as associated with a second USIM of the UE in a time-division-multiplexed (TDM) manner.

Currently, two kinds of switching procedures have been proposed. According to the first procedure, the UE may tune away from a gNB of the first network to a gNB of the second network for short periods of time. Such periods are known by the UE and by the gNB of the first network to be sufficiently short that the UE may tune, receive, and decode paging occasions and other network type information from the gNB of the second network and then retune back to the gNB of the first network within such a period of time that the gNB of the first network does not experience Radio Link Failure (RLF) and/or Beam Failure Detection (BFD) with the UE. The network type information may include, for example, System Information (SI) receiving, Synchronization Signal Block (SSB) detection, serving cell and neighboring cell signal measurement (e.g., intra-frequency, interfrequency, and inter-radio-access-technology (inter-RAT) measurement). Such switching is referred to as "Switching Without Leaving RRC_CONNECTED", or simply "Switching Without Leaving".

According to the second switching procedure, the UE may tune away from the gNB of the first network to use time and frequency resources of the gNB of the second network for periods of time that are sufficiently long and continuous in duration that the UE cannot maintain a connection to the gNB of the first network without the gNB of the first network experiencing RLF and/or BFD. Thus, the UE must leave the RRC_CONNECTED state associated with the gNB of the first network before switching to the gNB of the second network. Such switching is known as "Switching with Leaving RRC_CONNECTED", or simply "Switching with Leaving".

For the case of Switching Without Leaving, the UE may know the duration and periodicity of paging occasions and other network type information events that occur with the gNB of the second network. Thus, to assist the UE in receiving the periodic network type information from the gNB of the second network, the UE may request the gNB of the first network to not schedule any uplink (UL) or downlink (DL) time and frequency resources during one or more periods of time when the UE intends to receive/transmit information on the gNB of the second network. The term "gap" is used to define such a period of time when the gNB of the first network does not schedule any UL or DL time and frequency resources for the UE. Accordingly, the aforementioned period of time allows the UE to omit receiving/transmitting with the gNB of the first network. The gap may delimit a period of time during which the UE may be busy receiving and/or transmitting with a gNB of another cell and/or network. For the purposes of this disclosure, a gap in the UL or DL time and frequency resources of a gNB of a first network may be scheduled to provide the UE with the opportunity to switch from the gNB of the first network to a gNB of the second network for a scheduled period of time that aligns with transmissions of network information of the second network. In some examples, a gap may be scheduled by a gNB of a network to reoccur at a fixed periodicity.

As described in greater detail below, while the gap schedule between the UE and the gNB of the first network may facilitate an efficient use of time and frequency resources, a handover between the first gNB and a second gNB of the first network may cause the use of the gaps for paging and other operations with the gNB of the second network by the UE to cease (e.g., until similar gaps may be defined between the UE and the second gNB of the first network). This cessation may significantly reduce the efficiency provided by the use of Switching Without Leaving.

SUMMARY OF INVENTION

In one example, a user equipment (UE), comprising: one or more non-transitory computer-readable media having computer-executable instructions embodied thereon; and at least one processor coupled to the one or more non-transitory computer-readable media and configured to execute the computer-executable instructions to: while maintaining a first Radio Resource Control (RRC) connection with a first base station (BS) of a first network, receive transmissions from a BS of a second network during at least one time period specified in a switch gap configuration; receive an RRC reconfiguration message from the first BS of the first network, the RRC reconfiguration message comprising a first command and a second command, the first command instructing the UE to begin a handover procedure from the first BS of the first network to a second BS of the first network, and the second command controlling usage of the switch gap configuration by the UE in association with the handover procedure; initiate execution of the handover procedure according to the first command; and after initiating execution of the handover procedure, where the second command enables continued usage of the switch gap configuration, continue to receive transmissions from the BS of the second network during the at least one time period specified in the switch gap configuration.

In one example, a base station (BS) of a first network, the BS comprising: one or more non-transitory computer-readable media having computer-executable instructions embodied thereon; and at least one processor coupled to the one or more non-transitory computer-readable media and configured to execute the computer-executable instructions to: maintain a first Radio Resource Control (RRC) connection with a user equipment (UE) while facilitating gaps in communication with the UE according to a switch gap configuration; transmit, to another BS of the first network, a handover request message comprising the switch gap configuration; receive, from the other BS of the first network, a handover request acknowledgment message comprising an RRC reconfiguration message, the RRC reconfiguration message comprising a first command and a second command, the first command instructing the UE to begin a handover procedure from the BS of the first network to the other BS of the first network, and the second command controlling usage of the switch gap configuration by the UE in association with the handover procedure; and transmit, to the UE, the RRC reconfiguration message.

In one example, a base station (BS) of a first network, the BS comprising: one or more non-transitory computer-readable media having computer-executable instructions embodied thereon; and at least one processor coupled to the one or more non-transitory computer-readable media and configured to execute the computer-executable instructions to: receive, from another BS of the first network, a handover request message for a user equipment (UE), the handover request message comprising a switch gap configuration that specifies at least one time period during which the UE receives transmissions from a BS of a second network; determine whether the BS of the first network is capable of providing the at least one time period to facilitate receiving, by the UE, the transmissions from the BS of the second network; generate an RRC reconfiguration message comprising a first command and a second command, the first command instructing the UE to begin a handover procedure from the other BS of the first network to the BS of the first network, and the second command controlling usage of the switch gap configuration by the UE in association with the handover procedure based on whether the BS of the first network is capable of providing the at least one time period; and transmit, to the other BS, a handover request acknowledgment message comprising the RRC reconfiguration message.

BRIEF DESCRIPTION OF DRAWINGS

Implementations of the present technology will now be described, by way of example only, with reference to the attached figures.

FIG. 4 illustrates a flow diagram of a method for a UE to facilitate a continuation of a switching procedure during and after a handover procedure, according to an example implementation of the present disclosure.

FIG. 7 illustrates an example of a new Other Configuration (otherConfig) information element (IE), according to an example implementation of the present disclosure.

FIG. 8B illustrates an example of a new RRC Reconfiguration (RRCReconfiguration) IE, according to an example implementation of the present disclosure.

DESCRIPTION OF EMBODIMENTS

Figure 1:
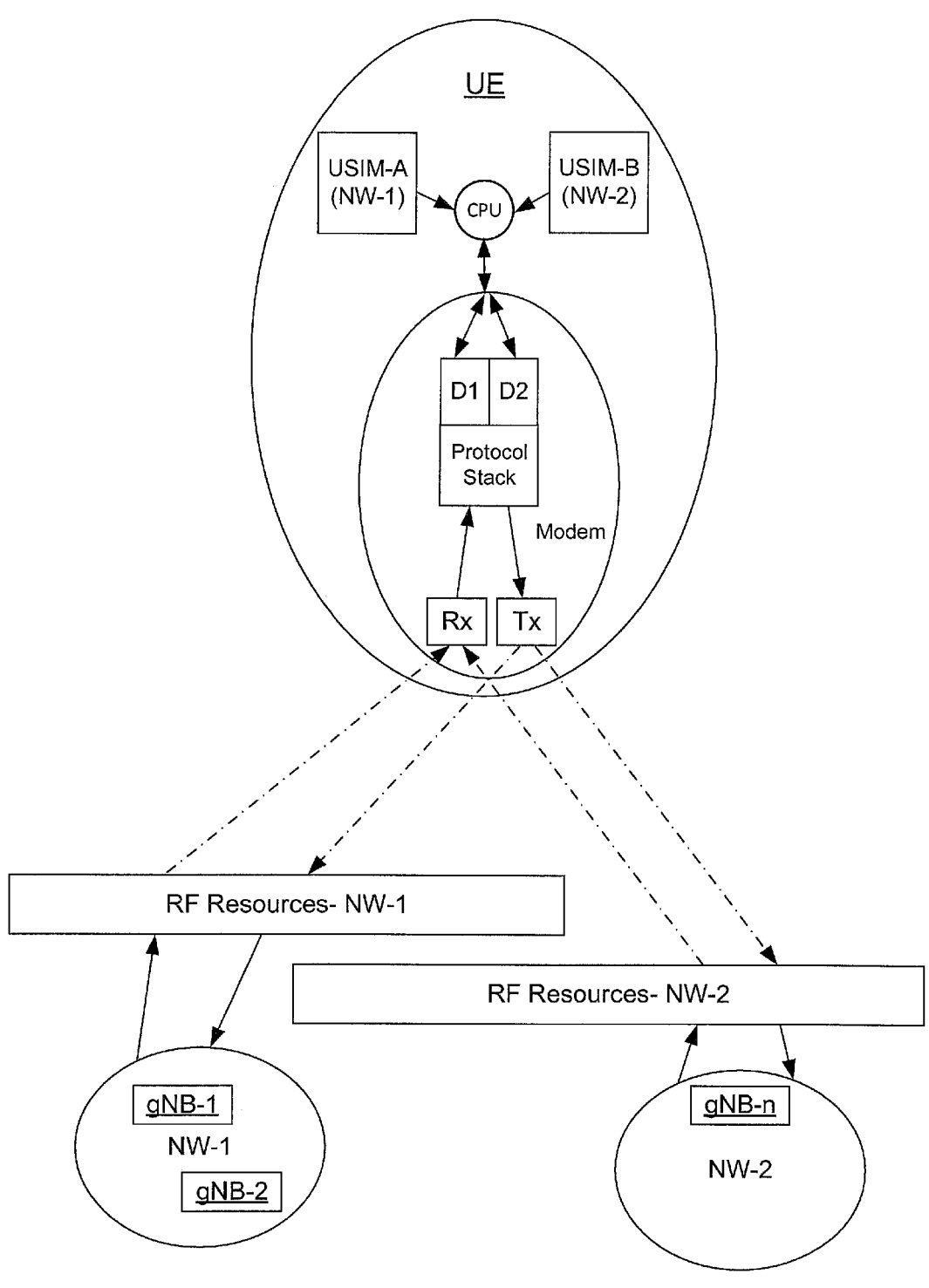
FIG. 1 illustrates a block diagram of a MUSIM UE in communication with gNBs of two different networks, according to an example implementation of the present disclosure.

The 3GPP is a collaboration agreement that aims to define globally applicable technical specifications and technical reports for third and fourth generation wireless communication systems. The 3GPP may also define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14, 15, and so on) including New Radio (NR) which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station (BS), which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices may include cellular phones, smart phones, personal digital assistants (PDAs), laptop computers, netbooks, e-readers, wireless modems, etc.

In the 3GPP specifications, a wireless communication device may typically be referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In the 3GPP specifications, a BS is typically referred to as a NodeB, an evolved NodeB (CNB), a home enhanced or evolved NodeB (HeNB), a Next Generation NodeB (gNB) or some other similar terminology. As the scope of the disclosure should not be limited to 3GPP standards, the terms "base station," "NodeB," "cNB," "HeNB," and "gNB" may be used interchangeably herein to mean the more general term "base station." Furthermore, the term "base station" or "BS" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and/or gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in the E-UTRA and E-UTRAN overall description, as used herein, a "cell" may be defined as a "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an cNB and/or gNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s).

"Activated cells" are those configured cells on which the UE is transmitting and receiving. That is, activated cells are those cells for which the UE monitors the physical downlink control channel (PDCCH) and, in the case of a downlink transmission, those cells for which the UE decodes a physical downlink shared channel (PDSCH). "Deactivated cells" are those configured cells for which the UE is not monitoring the transmission of PDCCH. It should be noted that a "cell" may be described in terms of differing dimensions. For example, a "cell" may have temporal, spatial (e.g., geographical), and frequency characteristics.

The 5G communication systems, dubbed NR technologies by the 3GPP, envision the use of time/frequency/space resources to allow for services, such as Enhanced Mobile Broadband (eMBB) transmission, Ultra-Reliable Low-Latency Communications (URLLC) transmission, and massive Machine Type Communication (mMTC) transmission. Also, in NR, single-beam and/or multi-beam operations is considered for downlink and/or uplink transmissions.

Various examples of the systems and methods disclosed herein are now described with reference to the figures, where like reference numbers may indicate functionally similar elements. The systems and methods as generally described and illustrated in the Figures herein could be arranged and designed in a wide variety of different implementations. Therefore, the detailed description of the present disclosure as illustrated in the figures is not intended to limit scope of the present disclosure but is merely representative of the systems and methods.

According to various implementations of the present disclosure, a new mechanism is provided by which a "gap configuration" (or, as also used below, a "switch gap configuration") specifying one or more gaps scheduled between a UE and a first gNB of a first network, as described above, may be transported from the first gNB to a second gNB of the first network as part of a handover operation. More specifically, a switch gap configuration includes data specifying one or more time intervals, or "gaps", when the gNB of the first network does not schedule any UL or DL time and frequency resources for the UE. Accordingly, the aforementioned periods of time may allow the UE to omit receiving and/or transmitting with the gNB of the first network (e.g., such that the UE may employ those time periods to "switch" to a gNB of a second network to receive paging and other information). Such implementations may thus facilitate use of the gaps by the UE during and/or after the handover operation, thus retaining the efficiency associated with the Switching Without Leaving procedure during that time.

FIG. 1 illustrates a block diagram of a MUSIM UE in communication with gNBs of two different networks, according to an example implementation of the present disclosure. As depicted in FIG. 1, the UE may include a first USIM (USIM-A) to identify the UE with a first network NW-1 (or, alternately, NW-A), as well as a second USIM (USIM-B) to identify the UE with a second network NW-2 (or, alternately, NW-B). Further, first network NW-1 may include a first gNB (gNB-1) and a second gNB (gNB-2), and second network NW-2 may include a gNB (gNB-n). In other implementations, a greater number of gNBs may be included in either or both of first network NW-1 and second network NW-2.

In further reference to FIG. 1, the UE may also include at least one central processing unit (CPU) or other processor that is communicatively coupled to USIM-A and USIM-B to facilitate communication with first network NW-1 and second network NW-2, respectively, by way of a modulator/demodulator (modem) unit. The modem may include at least one transmitter (Tx) and at least one receiver (Rx) for communicating with first network NW-1 and second network NW-2 over radio frequency (RF) resources (e.g., time and frequency resources) corresponding to each network NW-1 and NW-2. The modem may also include a communication protocol stack in communication with transmitter Tx and receiver Rx, as well as two data processing regions D1 and D2 associated with first network NW-1 and second network NW-2, respectively. The UE may also include memory that is coupled to the at least one processor and that stores instructions that are executable by the at least one processor to perform various operations of the UE discussed herein. Other portions of the UE (e.g., a touchscreen, a microphone, a speaker, and so on that may receive or present data associated with data processing regions D1 and D2) are not explicitly depicted in FIG. 1.

To facilitate discussion in portions of the description below, first gNB-1 of first network NW-1 (as shown in FIG. 1) is referred to as gNB-1_NW-1, second gNB-1 of first network NW-1 is referred to as gNB-2_NW-1, and gNB-n of second network NW-2 is referred to as gNB-n_NW-2. In some implementations, each gNB may include at least one transmitter, at least one receiver, at least one processor, and memory that is coupled to the at least one processor and that stores instructions that are executable by the at least one processor to perform various operations of the gNB, as discussed herein.

In some implementations, the UE may accomplish a request for one or more gaps by sending gNB-1_NW-1 a Gap Configuration Assistance Information Message via a new IE called switchGapConfig. The transport of the switchGapConfig IE to gNB-1_NW-1 may be provided by UL-DCCH-Message::UEAssistanceInformation. In some implementations, the format of switchGapConfig may be derived from the existing IE measGapConfig of Technical Specification (TS) 38.331, such as by employing various parameters sufficient to identify and request one or more time intervals or periods during which UL and DL time and frequency resources for the UE are not to be scheduled by a gNB (e.g., gNB-1_NW-1, for the purpose of paging, receiving system information, and so on with gNB-n_NW-2).

In some implementations, the gaps requested in a Gap Configuration Assistance Information Message may be any of three types: "Periodic Gap", "A-periodic Gap", and "Autonomous Gap". A Periodic Gap may provide for a repeating period of time (e.g., establishing a pattern) where a gNB does not schedule any UL or DL time and frequency resources for the UE. An A-periodic Gap may provide for a single period of time where a gNB does not schedule any UL or DL time and frequency resources for the UE. An Autonomous Gap may indicate that the network does not configure gaps for the UE. The Gap Configuration Assistance Information Message may include multiple gap requests (e.g., two different Periodic gap patterns, or one Periodic gap pattern and one a-periodic gap).

In some implementations, the information provided by the UE to a gNB of first network NW-1 about a switching gap configuration via the Gap Configuration Assistance Information Message may include information about the starting time of the gap (e.g., expressed as an offset value or start System Frame Number (SFN), and a subframe), the gap length, and the gap repetition period. However, as the timing of the transmission of network resources between different networks may not be the same, the UE may map the timing information of the gap relative to a gNB of second network NW-2 (e.g., gNB-n_NW-2) onto the timing of the gNB of first network NW-1 (e.g., gNB-1_NW-1). Accordingly, the request to gNB-1_NW-1 may be in the form of mapped timing values of gNB-n_NW-2.

As a result of the Gap Configuration Assistance Information Message provided by the UE to gNB-1_NW-1, in some implementations, gNB-1_NW-1 may in turn provide to the UE a Gap Configuration Assistance Information Response Message (e.g., via the switchGapConfig IE, described above). The switchGapConfig IE may include one or more switch gap configurations for the switching process. The transport of the switchGapConfig IE to the UE may be provided by DLDCCH::RRCReconfiguration.OtherConfig. The one or more switch gap configurations provided in a Gap Configuration Assistance Information Response Message may include any of the three types discussed above: Periodic Gap, A-periodic Gap, and/or Autonomous Gap. The Gap Configuration Assistance Information Response Message may include one or more gap results. For example, the one or more switch gap configurations define one or more gaps (e.g., periodic, a-periodic, and/or autonomous gaps) where gNB-1_NW-1 will not assign the UE any UL/DL time and frequency resources, and thus the UE may tune away from gNB-1_NW-1 during those gaps to receive information from gNB-n_NW-2 and not miss receiving DL data or miss transmitting UL data with gNB-1_NW-1. In some implementations, the gaps may be synchronized to the NR/LTE frame structure.

As a result, if the UE is actively Switching Without Leaving gNB-1_NW-1 to receive paging and other signaling on gNB-n_NW-2, then the gaps in the gNB-1_NW-1 gap schedule of transmission/reception resources may enable the UE to switch to gNBn_NW-2 without missing scheduled transmission/reception resources of gNB1_NW-1. The gap schedules may be based upon the one or more switch gap configurations that were previously agreed to by both the UE and gNB-1_NW-1.

Currently, however, if the UE is handed over from gNB-1_NW-1 to a second gNB of first network NW-1 (e.g., gNB-2_NW-1) and the UE is actively Switching Without Leaving gNB-1_NW-1 to receive paging and other system information via gNBn_NW-2, then upon reception by the UE of a command to engage in a handover (e.g., via a RRCReconfiguration message) from gNB-1_NW-1 to gNB-2_NW-1, the UE is compelled to terminate the switching procedure between gNB-1_NW-1 and gNBn_NW-2, as gNB-2_NW-1 does not possess a copy of the previously generated one or more switch gap configurations that could otherwise be used by gNB-2_NW-1 to create gaps in the transmission and/or reception resources scheduled for the UE by gNB-2_NW-1 during or following the handover. For example, such gaps may be employed to provide the UE with opportunities to Switch Without Leaving gNB2_NW-1 to receive paging and other information via gNB-n_NW-2.

In some cases, the termination of the switching procedure by a concurrent handover process may cause the UE to miss pages on gNB-n_NW-2 until the UE can restart the switching procedure between the UE and gNB-2_NW-1 following the successful completion of the handover process. In addition, to restart the switching procedure between the UE and gNB-2_NW-1 after the handover, the UE acquires one or more new switch gap configurations from gNB-2_NW-1, which may force the UE to send a Gap Configuration Assistance Information Message representing the timing of periodic and aperiodic network type information of gNB-n_NW-2 to gNB-2_NW-1 so that gNB-2_NW-1 may reply to the UE with the one or more new switch gap configurations. However, such a request by the UE to gNB-2_NW-1 subsequent to the handover may represent a waste of resources, as the one or more switch gap configurations received from gNB-2_NW-1 subsequent to the handover may be the same as those received by the UE from gNB-1_NW-1 prior to the handover from gNB1_NW-1 because the one or more switch gap configurations from gNB-1_NW-1 and from gNB-2_NW-1 may be based on the same timing of periodic and aperiodic network type information of gNB-n_NW-2. Consequently, various implementations of the present disclosure may facilitate the sharing of the previously generated switch gap configuration information with gNB-2_NW-1.

For the remainder of this disclosure, while we employ the abbreviation "gNB" to identify the 5G NodeB base station, this reference may also apply to a Next Generation Evolved Node-B (cNB) base station. Also, within this disclosure, the terms "terminal", "device", "User Equipment", and "UE" may be used interchangeably.

Additionally, for the remainder of this disclosure, a Multi-USIM (MUSIM) device may be presumed to be configured with a USIM-A associated to first network NW-1 (or NW-A) and a USIM-B associated to a second network NW-2 (or NW-B), as illustrated in FIG. 1. However, in practice, USIM-A and USIM-B may be associated to the same network but treated by the network as independent devices with independent subscriptions. Moreover, a MUSIM application or feature of the UE may be one that interacts with the multiple USIMs on the UE. In some implementations, a processor resident in the UE (as indicated in FIG. 1) may control a "switching procedure" of the UE, as described in greater detail herein.

Figure 2:
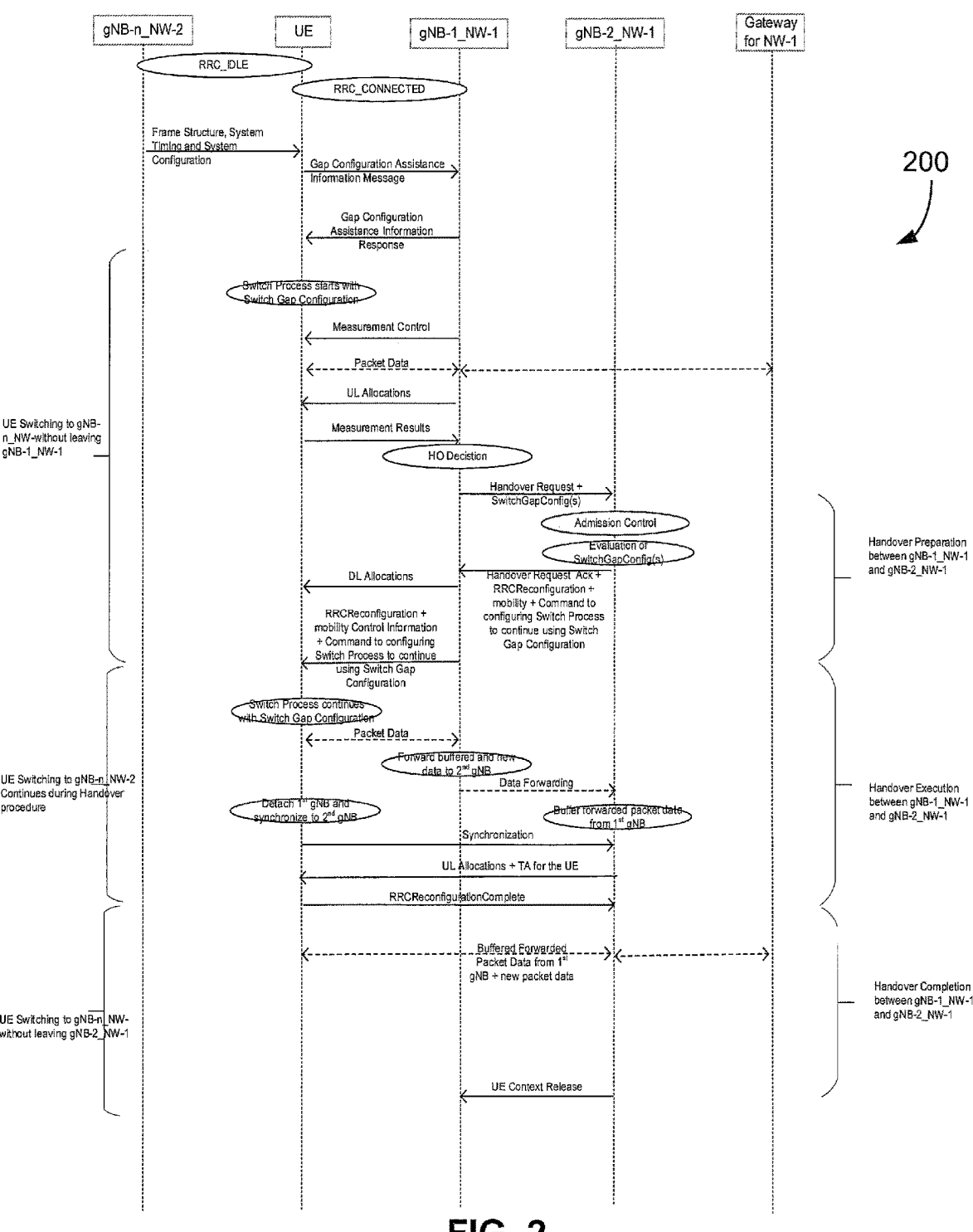
FIG. 2 illustrates a signaling diagram for continuing use of a switch gap configuration during a handover procedure between gNBs, according to an example implementation of the present disclosure.
Figure 3:
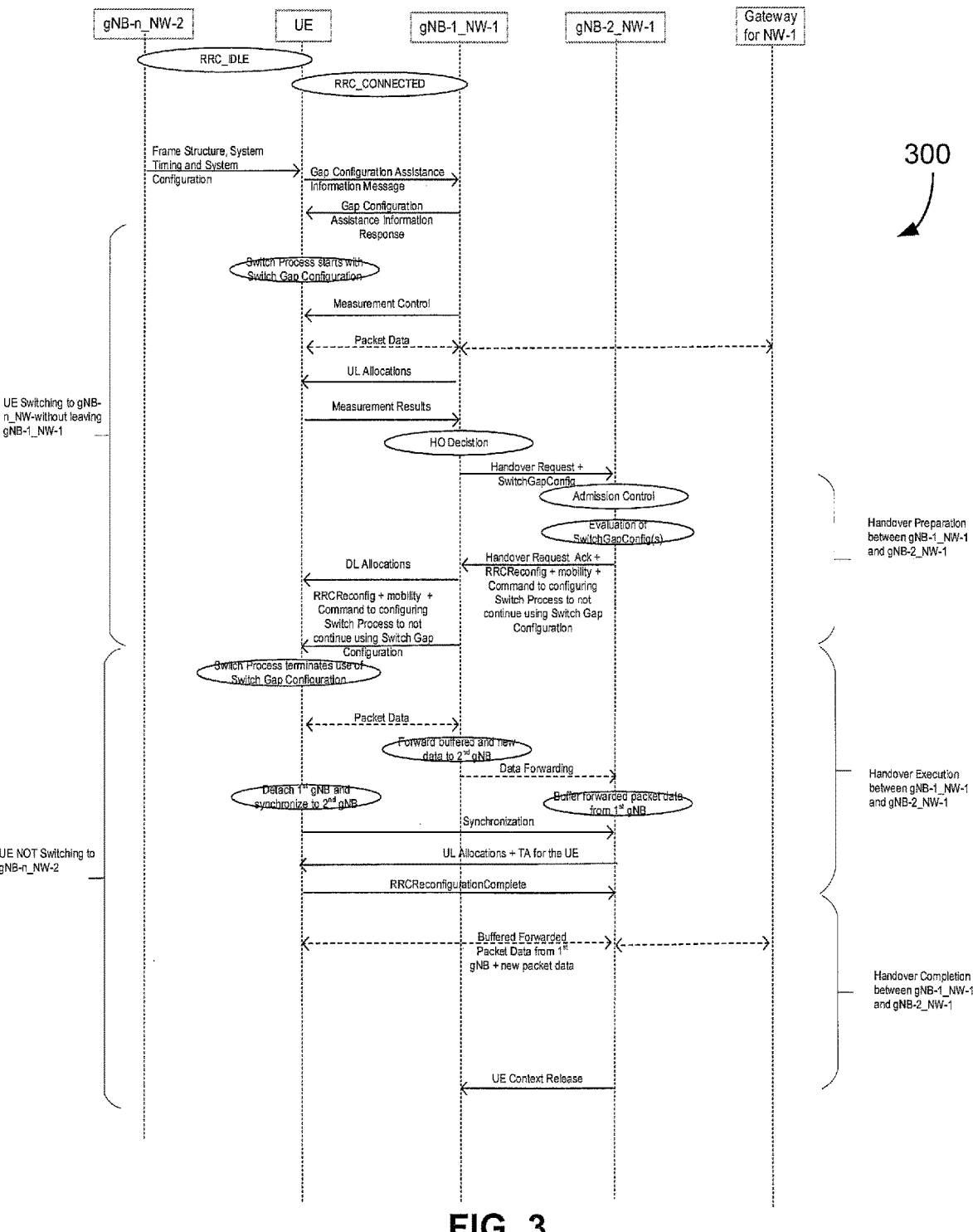
FIG. 3 illustrates a signaling diagram for ceasing use of a switch gap configuration during a handover procedure between gNBs, according to an example implementation of the present disclosure.

FIG. 2 illustrates a signaling diagram 200 for continuing use of a switch gap configuration during a handover procedure between gNBs, according to an example implementation of the present disclosure. FIG. 3 illustrates a signaling diagram 300 for ceasing use of a switch gap configuration during a handover procedure between gNBs, according to an example implementation of the present disclosure. As seen in FIGS. 2 and 3, a first portion of communications among the UE, gNB-1_NW-1, gNB-2_NW1, a gateway for first network NW-1, and gNB-n_NW-2 at least up until a handover decision is made by gNB-1_NW-1 are substantially similar between signaling diagrams 200 and 300.

For example, a switching procedure may be provided to enable the UE to switch between (1) the use of UL/DL time and frequency resources as scheduled by a gNB of first network NW-1 (e.g., gNB-1_NW-1) that is associated with a first USIM (USIM-A) of the UE and (2) the use of UL/DL time and frequency resources as scheduled by a gNB of second network NW-2 (e.g., gNB-n_NW-2) that is associated with a second USIM (USIM-B) of the UE while not disregarding or "missing" any time and frequency resources scheduled to the UE by gNB-1_NW-1.

In some implementations, the switching procedure may include a method for the acquisition of configuration data from gNB-1_NW-1 by way of the UE requesting such data by way of a Gap Configuration Assistance Information message, where the configuration data may be employed to control the operation of the switching procedure. The configuration data may include one or more switch gap configurations. In some implementations, the one or more switch gap configurations may identify periods of time where gNB-1_NW-1 will not schedule UL or DL time and frequency resources for the UE. Such periods of time may be used by the switching procedure to determine opportunities when the UE can network-switch from gNB-1_NW-1 to gNB-n_NW-2 for the purpose of using time and frequency resources of gNB-n_NW-2 while not missing any scheduled time and frequency resources of gNB-1_NW-1. The duration and periodicity of the timing periods of the one or more switch gap configurations, having been proposed by the UE to the gNB-1_NW-1 via the Gap Configuration Assistance Information message, may be either accepted or rejected by gNB-1_NW-1.

In some implementations, as indicated in FIGS. 2 and 3, the proposed timing periods may be based on the acquisition of information by the UE about the frame structure, system timing, and system configuration of gNB-n_NW-2. Further, in some implementations, the frame structure, system timing, and system configuration information may be based on the reception, by the UE, of the Primary Synchronization Signal (PSS) and the Secondary Synchronization Signal (SSS), and the Master Information Block (MIB), System Information Block 1 (SIB1), and System Information Block 2 (SIB2) messages broadcast by gNB-n_NW-2. The timing periods may represent occasions where gNB-n_NW-2 may schedule time and frequency resources for the UE to receive at least pages from gNB-n_NW-2.

Accordingly, in some implementations, the UE may create at least one Gap Configuration Assistance Information Message that identifies the timing periods when the UE may desire to receive pages, SIB update information, and/or other broadcast information from gNB-n_NW-2. Further, in some implementations, the UE may transmit the Gap Configuration Assistance Information Message to gNB-1_NW-1 via UL-DCCH-Message.UEAssistanceInformation.switchGapConfig. The gNB-1_NW-1 may respond to the Gap Configuration Assistance Information Message by transmitting to the UE at least one switch gap configuration message in a Configuration Assistance Information Response message (e.g., via DL-DCCH::RRCRcconfiguration.OtherConfig.switchGapConfig).

In some implementations, the switching procedure may use the one or more switch gap configurations to determine opportunities when the UE can Switch Without Leaving gNB-1_NW-1 to receive paging and other information from gNB-n_NW-2. The switching procedure enabled to use the one or more switch gap configurations upon receipt of the RRCReconfiguration. OtherConfig message that transported the switchGapConfig IE.

The switch gap configurations that are actively in use by the switching procedure to determine opportunities when the UE can Switch Without Leaving a first network to a second network (e.g., first network NW-1 to second network NW-2) may be referred to as the "currently-jointly-in-use" one or more switch gap configurations, which indicates that a gNB is actively using the one or more switch gap configurations to create gaps in the UL/DL time and frequency resources scheduled to a UE, and the switching procedure is actively using the same one or more switch gap configurations to determine opportunities when the UE can Switch Without Leaving first network NW-1 to second network NW-1.

In various implementations described herein, as depicted in diagrams 200 and 300 of FIGS. 2 and 3, respectively, a method of operating the UE, gNB-1_NW-1, and gNB2-NW-1 may enable the switching procedure of the UE to operate concurrently with a handover procedure of the UE, such that during the procedure to handover the UE from gNB-1_NW-1 to gNB-2_NW-1, the UE may continue to switch to gNBn_NW-2. More specifically, the method may enable the continued operation of the switching procedure during and after a handover procedure of the UE, as based on the one or more switch gap configurations currently in use by the UE and source gNB of the handover (e.g., gNB-1_NW-1), and the source gNB sharing a copy of the one or more switch gap configurations with the target gNB of the handover (e.g., gNB2_NW-1).

In an example operation, gNB-1_NW-1 may provide to gNB-2_NW-1 a copy of the currently-jointly-in-use one or more switch gap configurations being used by the UE. In some implementations, gNB-1_NW-1 may provide the copy to gNB-2_NW-1 following a determination by gNB-1_NW-1 to hand over the UE to gNB-2_NW-1, but before gNB-1_NW-1 issues a handover command to the UE. In some implementations, gNB-1_NW-1 may render the handover decision (HO Decision in FIGS. 2 and 3) based on signal measurement results transmitted from the UE to gNB-1_NW-1.

In some implementations, a benefit of providing gNB-2_NW-1 a copy of the currently-jointly-in-use one or more switch gap configurations prior to the handover is that the UE then may not have to reacquire one or more switch gap configurations from gNB-2_NW-1 via a Gap Configuration Assistance Information message sent by the UE to gNB-2_NW-1 following the handover, thus conserving time and frequency resources.

In some implementations, gNB-1_NW-1 and gNB-2_NW-1 may communicate via the Xn/NG interface to transport configuration and control data. Further, in some implementations, the transport of configuration data and control data from gNB-1_NW-1 to gNB-2_NW-1 via the Xn/NG interface in preparation for (i.e., prior to) a handover may utilize a handover request message (e.g., more specifically, the HANDOVER-REQUEST Message of TS 36.413). More particularly, the HANDOVER-REQUEST Message may be used for the passing of the Source-To-Target-Transparent-Container (e.g., see TS 29.280), which may be used for passing an RRC-Container, which may contain information necessary for preparing gNB-2_NW-1 to accept the handover. The Source-To-Target-Transparent-Container included in the handover request message may contain one or more switch gap configurations, possibly along with other configuration and control data. Via this mechanism, gNB-1_NW-1 may send the copy of the currently-jointly-in-use one or more switch gap configurations to indicate to gNB2_NW-1 that gNB-1_NW-1 is providing gaps in the schedule of UL or DL time and frequency resources for the UE as defined by the one or more switch gap configurations.

In another example operation, the method may include gNB-2_NW-1 receiving, from gNB-1_NW-1, a copy of the currently-jointly-in-use at least one switch gap configurations prior to the handover of the UE from gNB-1_NW-1 to gNB-2_NW-1. As indicated above, in some implementations, gNB-1_NW-1 and gNB-2_NW-1 may communicate via the Xn/NG interface to transport configuration and control data. Further, in some implementations, the transport of configuration data and control data from gNB-1_NW-1 to gNB-2_NW-1 via the Xn/NG interface in preparation for (i.e., prior to) a handover may use a handover request message (e.g., the HANDOVER-REQUEST Message of TS 36.413). In some implementations, the HANDOVER-REQUEST Message may be used for the passing of the Source-To-Target-Transparent-Container (e.g., see TS 29.280), which may be used for passing an RRC-Container, which may contain information necessary for preparing gNB2_NW-1 to accept the handover. The Source-To-Target-Transparent-Container included in the handover request message may contain one or more switch gap configurations, possibly in addition to other configuration and control data. Accordingly, reception by gNB-2_NW-1 of the copy of the currently-jointly-in-use one or more switch gap configurations indicates to gNB-2_NW-1 that gNB-1_NW-1 is currently providing gaps in its schedule of UL or DL time and frequency resources for the UE, as defined by the one or more switch gap configurations.

In another example operation, the method of FIGS. 2 and 3 may include an operation that, upon receipt of a copy of the currently-jointly-in-use one or more switch gap configurations from gNB-1_NW-1, gNB-2_NW-1 may evaluate the copy to determine if gNB-2_NW-1 is capable of providing the gap periods for the UE, as defined by the copy. Based on that determination, gNB-2_NW-1 may accept or reject the copy.

In some implementations, if gNB-2_NW-1 accepts the copy of the currently-jointly-in-use one or more switch gap configurations (as represented by diagram 200 of FIG. 2), gNB-2_NW-1 is capable of, and thus will, create gaps in the UL/DL time and frequency resources scheduled for the UE during and following the handover. In some implementations, these gaps may provide the UE with the opportunities to Switch Without Leaving gNB-2_NW-1 to receive paging and other signaling from gNBn_NW-2. Also, in some implementations, the switching procedure may continue to determine opportunities for the UE to transition from network switching between gNB1_NW-1 and gNB-n_NW-2 and network switching between gNB-2_NW-1 and gNBn_NW-2, where the opportunities may occur at any time during the handover procedure. Such ability is due to the UE, gNB-2_NW-1, and gNB-2_NW-1 all sharing an agreed-upon copy of the currently-jointly-in-use one or more switch gap configurations during the handover procedure. In some embodiments, a benefit of the ability of the UE switching procedure to perform such transitions at any time of the UE's choosing during the handover procedure is that the UE is unlikely to miss paging operations on gNB-n_NW-2 due to a lack of scheduling gaps on gNB-1_NW-1 or gNBn_NW-2.

If, instead, gNB-2_NW-1 rejects the copy of the currently-jointly-in-use one or more switch gap configurations (as represented by diagram 300 of FIG. 3), gNB-2_NW-1 will not create gaps in the UL/DL time and frequency resources scheduled for the UE during and following the handover (as per the currently-jointly-in-use one or more switch gap configurations evaluated). Further, in some implementations, the switching procedure of the UE may not continue to determine opportunities for the UE to transition from network switching between gNB-1_NW-1 and gNB-n_NW-2 and network switching between gNB-2_NW-1 and gNB-n_NW-2. This cessation may occur because such opportunities may not be determined at any time during the handover procedure, as the UE, gNB-1_NW-1, and gNB-2_NW-1 do not share an agreed-upon copy of the currently-jointly-in-use one or more switch gap configurations as a result.

In another example operation, the method may include the generation of a command configured according to the acceptance or rejection of the copy by gNB-2_NW-1. In some implementations, such command may be referred to as a switchConfigurationContinue command. In some implementations, the switchConfigurationContinue command may take on a value of TRUE if the copy is accepted by gNB-2_NW-1, or the switchConfigurationContinue command may take on a value of FALSE if the copy is rejected by gNB-2_NW-1. Also, in some implementations, the switchConfigurationContinue command may be included in an RRCReconfiguration message. In such implementations, the RRCReconfiguration message may (1) trigger a handover procedure in the UE and (2) reconfigure the UE as part of the handover procedure, where the handover procedure includes gNB-2_NW-1 as the target gNB and gNB1_NW-1 as the source gNB of the handover.

In some implementations, the switchConfigurationContinue command being set to TRUE (e.g., as depicted in FIG. 2) may configure the switching procedure of the UE to continue to use of the currently-jointly-in-use one or more switch gap configurations during and after the handover of the UE to gNB-2_NW-1.

Also, in some implementations, the switchConfiguration-Continue command being set to FALSE (e.g., as depicted in FIG. 3) may configure the switching procedure of the UE to not continue to use of the currently-jointly-in-use one or more switch gap configurations during and after the handover of the UE to gNB-2-_NW-1. As an alternative to including the switchConfigurationContinue command that configures the switching procedure of the UE not to continue to use the currently-jointly-in-use one or more switch gap configurations during and after the handover of the UE to gNB2_NW-1, an absence of a switchConfigurationContinue command in the RRCReconfiguration message from gNB-2_NW-1 may indicate that the switching procedure of the UE is not to continue to use the currently-jointly-in-use one or more switch gap configurations during and after the handover of the UE to gNB-2-NW-1.

In another example operation, the method may include gNB-2_NW-1 sending the generated RRCReconfiguration message (e.g., including the switchConfigurationContinue command to configure the switching procedure of the UE) to gNB1_NW-1. In some implementations, gNB-1_NW-1 and gNB-2_NW-1 may communicate the RRCReconfiguration message via the Xn/NG interface to transport configuration and control data. Further, in some implementations, the transport of configuration and control data from gNB-1_NW-1 to gNB-2_NW-1 via the Xn/NG interface in preparation for (i.e., prior to) a handover may use a handover request acknowledgment message (e.g., the HANDOVER-REQUEST-ACKNOWLEDGE Message of TS 36.413). In some implementations, the HANDOVER-REQUEST-ACKNOWLEDGE message may be sent in response to a HANDOVER-REQUEST message. In some implementations, the HANDOVER-REQUEST-ACKNOWLEDGE Message may be used for the passing of the Target-To-Source-Transparent-Container (e.g., see TS 29.280), which may be used for passing an RRC-Container, which may contain an RRCReconfiguration message (e.g., the RRCReconfiguration message prepared by the target gNB of the handover, gNB2_NW-1, and delivered to the UE by the source gNB of the handover, gNB-1_NW-1). In turn, in some implementations, the RRCReconfiguration message may carry an otherConfig IE (described in greater detail below), which may carry the command that configures the switching process of the UE.

In another example operation, the method may include gNB-1_NW-1 forwarding, to the UE, the RRCReconfiguration message that was received from gNB-2_NW-1. In some implementations, the RRCReconfiguration message may include a command (e.g., a command carried in the otherConfig IE) that configures the switching procedure of the UE. In some implementations, gNB-1_NW-1 may use the PDSCH physical channel to transport data to the UE. Moreover, in some implementations, the PDSCH physical channel may use the Downlink Shared Channel (DL-SCH) transport channel, and the DL-SCH transport channel may use the Dedicated Control Channel (DCCH) logical channel. Also, in some implementations, the DCCH logical channel may carry the RRCReconfiguration message that includes a command that configures the switching procedure of the UE.

In another example operation, the method may include gNB-2_NW-1 sending the UE a command (e.g., a command based on the results of an evaluation undertaken by gNB-2_NW-1). In some implementations, the evaluation may be made based upon data provided by gNB-1_NW-1 to gNB-2_NW-1, where the data may be a copy of the currently-jointly-in-use one or more switch gap configurations being used by the UE and gNB-1_NW-1.

In some implementations, a result of the evaluation by gNB-2_NW-1 may be that gNB-2_NW-1 is capable of providing gaps in its schedule of transmission and/or reception resources assigned to the UE. In some implementations, a command may reflect the result of the evaluation, and may be issued by gNB-2_NW-1. In some implementations, the issued command may indicate to the UE that the one or more switch gap configurations currently-jointly-in-use between the UE and gNB-1_NW-1 may also be valid for continued use by the switching procedure of the UE to determine opportunities when the UE may Switch Without Leaving gNB-2_NW-1 to receive paging and other information from gNB-n_NW-2 during and after handover (e.g., substantially continuous switching may be allowed during and after handover).

In some implementations, an alternate result of the evaluation by gNB-2_NW-1 may be that gNB-2_NW-1 is incapable of providing gaps in its schedule of transmission and/or reception resources assigned to the UE. In some implementations, an alternate command may be associated with the alternate result, and the associated alternate command may be issued by gNB-2_NW-1. In some implementations, the issued alternate command may indicate to the UE that the one or more switch gap configurations currently-jointly-in-use between the UE and gNB-1_NW-1 may also not be valid for continued use by the switching procedure of the UE to determine opportunities when the UE can Switch Without Leaving gNB-2_NW-1 to receive paging and other information from gNB-n_NW-2 during and after handover.

In some implementations, gNB-2_NW-1 may use the RRCReconfiguration message that triggers the handover of the UE from gNB-1_NW-1 to gNB-2_NW-1 to also transport the commands to the UE via the otherConfig IE. Alternately, in some implementations, the absence of a command in the RRCReconfiguration message that triggers the handover of the UE from gNB-1_NW-1 to gNB-2_NW-1 may indicate to the UE to disable the continued use in the switching procedure of the currently-jointly-in-use one or more switch gap configurations to determine opportunities when the UE can Switch Without Leaving gNB-2_NW-1 to receive paging and other information on gNB-n_NW-2 during and after handover.

FIG. 4 illustrates a flow diagram of a method 400 for a UE to facilitate a continuation of a switching procedure during and after a handover procedure, according to an example implementation of the present disclosure. In some implementations, fewer than all of the operations depicted in FIG. 4 may be executed. Also, in some implementations, some of the operations in FIG. 4 may be executed in association with each handover, while some of the operations may be executed less often than with each handover.

In the method 400, at operation 402, a determination may be made as to whether the UE is configured with MUSIM (e.g., dual USIM) capability. If not so configured, then method 400 may end. Otherwise, method 400 may proceed to operation 404.

Collectively, operations 404, 406, and 408 may confirm whether various conditions of the UE have been met before proceeding to the remainder of method 400. For example, at operation 404, a determination may be made as to whether USIM-A is enabled (e.g., in a state in which USIM-A may be used to access an associated network). Also, at operation 406, a determination may be made as to whether USIM-B is enabled. If either USIM-A or USIM-B, or both, are disabled, method 400 may continue to execute operations 404 and 406 until both USIM-A and USIM-B are enabled. At operation 408, a determination may be made as to whether the UE has established a connected state (e.g., RRC_CONNECTED) with a base station of a network associated with either USIM-A (e.g., referred to in FIG. 4 as gNB-A) or USIM-B (e.g., referred to in FIG. 4 as gNB-B), but not both (e.g., as indicated by the exclusive-OR ("xor") operation depicted in operation 408 of FIG. 4). If the UE has established a connected state with a gNB of a network associated with either USIM-A or USIM-B, but not both, then method 400 may proceed to operation 410. For example, the UE may be in an RRC_CONNECTED state with gNB-A and in an RRC_IDLE state with gNB-B, or vice versa. Otherwise, control may return to operation 404.

At operation 410, the UE may obtain system timing information from the gNB with which the UE is in an RRC_IDLE state. In some implementations, the system timing information may include the frame structure, system timing, and/or system configuration information based on the UE's reception of PSS, SSS, MIB, SIB1, and/or SIB2 messages broadcast by the gNB in the RRC_IDLE state with the UE. At operation 412, the UE may determine a set of gap parameters from the obtained system timing information.

At operation 414, the UE may generate and transmit a request to the gNB with which the UE is in the RRC_CONNECTED state for one or more switch gap configurations based on the gap parameters. At operation 416, the UE, in response to the previously transmitted request, may receive the requested one or more switch gap configurations from the gNB with which the UE is in the RRC_CONNECTED state. In some implementations, if the UE does not receive the requested switch gap configurations, method 400 may end, or may return to operation 404.

At operation 418, the UE may initiate a switching procedure that determines opportunities for the UE to switch to the gNB with which the UE is in the RRC_IDLE state, based on the received one or more switch gap configurations, without leaving the gNB with which the UE is in the RRC_CONNECTED state.

At operation 420, the UE may determine whether a handover command has been received (e.g., while the switching procedure of operation 418 is operating). If the handover command has been received, method 400 may proceed to operation 426. At operation 426, the UE may determine whether the message that transported the handover command to the UE also transported a switchConfigurationContinue command. If the message included a switchConfigurationContinue command, method 400 may proceed to operation 428. At operation 428, the UE may determine whether the switchConfigurationContinue command is set to TRUE or FALSE. If the switchConfigurationContinue command is set to TRUE, the UE may return to operation 420 and may continue the switching procedure to switch to the gNB with which the UE is in the RRC_IDLE state without leaving the gNB with which the UE is in the RRC_CONNECTED state.

If the message that transported the handover command to the UE did not include a switchConfigurationContinue command (as determined at operation 426) or if the received switchConfigurationContinue command is set to FALSE (as determined at operation 428), method 400 may proceed to operation 424. At operation 424, the UE may terminate the switching procedure, thus ceasing to switch to the gNB with which the UE is in RRC_IDLE state. In some implementations, the UE may also remove the one or more switch gap configurations and terminate method 400.

Also at operation 420, while the UE does not receive a handover command (e.g., while the UE continues to perform the switching procedure), method 400 may proceed to operation 422. At operation 422, the UE may again determine whether the UE remains in the RRC_CONNECTED state with either, but not both, gNB-A or gNB-B, in a manner similar to operation 408. If not, method 400 may proceed to operation 424, which may perform as described above (e.g., the UE may terminate the switching procedure, thus ceasing to switch to the gNB with which the UE is in RRC_IDLE state, remove the one or more switch gap configurations, and terminate method 400). Otherwise, method 400 may return to operation 420 and may continue to perform the switching procedure to facilitate switching to the gNB with which the UE is in the RRC_IDLE state without leaving the gNB with which the UE is in the RRC_CONNECTED state.

Figure 5:
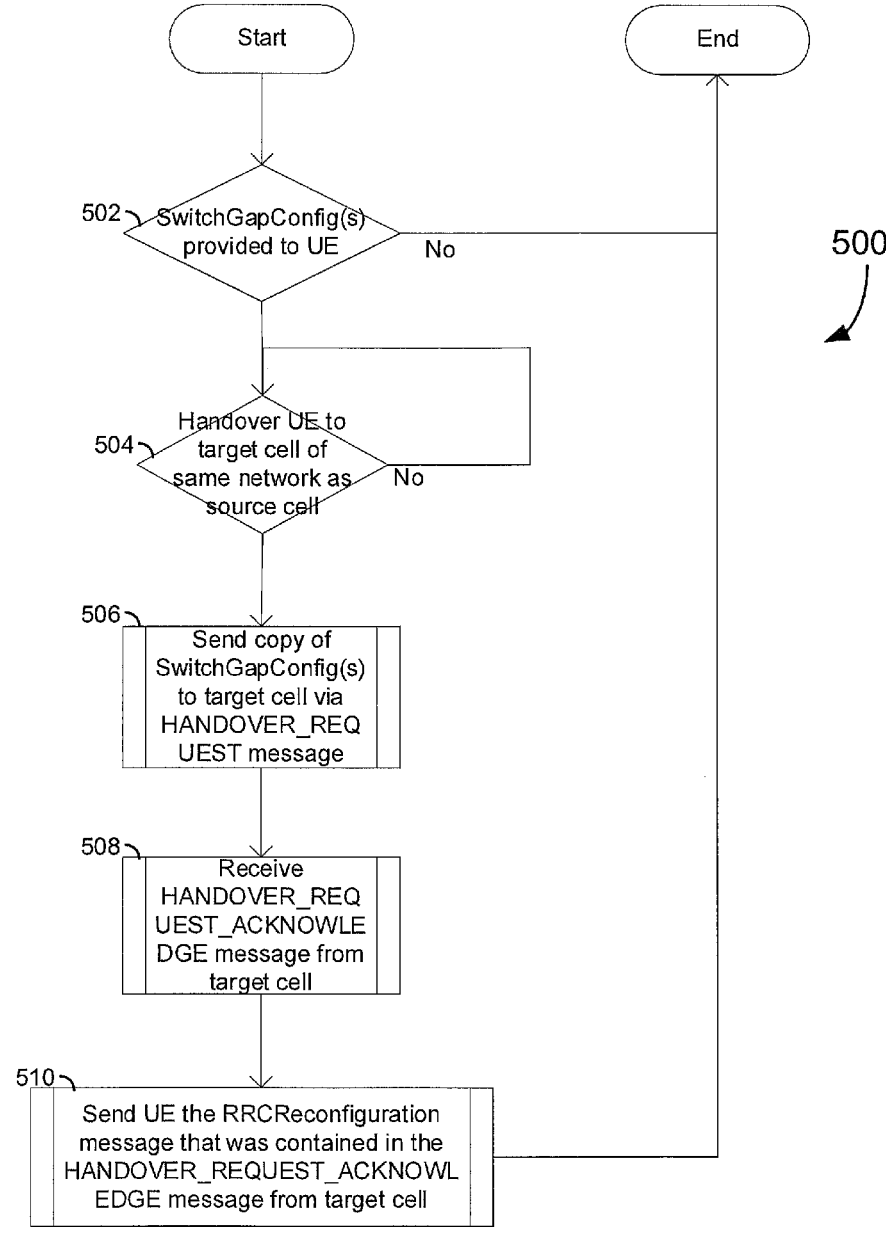
FIG. 5 illustrates a flow diagram of a method for a source gNB to facilitate a continuation of a switching procedure during and after a handover procedure, according to an example implementation of the present disclosure.

FIG. 5 illustrates a flow diagram 500 of a method for a source gNB to facilitate a continuation of a switching procedure during and after a handover procedure, according to an example implementation of the present disclosure. In method 500, at operation 502, the source gNB may determine whether the source gNB has provided one or more switch gap configurations to the UE. If not, method 500 may end. Otherwise, method 500 may proceed to operation 504. At operation 504, the source gNB may determine whether a handover operation of the UE to a target gNB of the same network as the source gNB should be performed. If not, the source gNB may make the same determination (e.g., repeatedly) until such a handover is to be performed, at which point method 500 may proceed to operation 506.

At operation 506, the source gNB may transport, to the target gNB, a copy of the one or more switch gap configurations previously provided to the UE. In some implementations, the copy of the one or more switch gap configurations may be provided to the target gNB by way of a HANDOVER-REQUEST message to initiate the handover operation. Method 500 may then proceed to operation 508.

At operation 508, the source gNB may receive a HANDOVER-REQUEST-ACKNOWLEDGE message from the target gNB in response to the earlier HANDOVER-REQUEST from the source gNB. At operation 510, the source gNB may transport, to the UE, an RRCReconfiguration message that was contained in the received HANDOVER-REQUEST-ACKNOWLEDGE message. Method 500 may then terminate.

Figure 6:
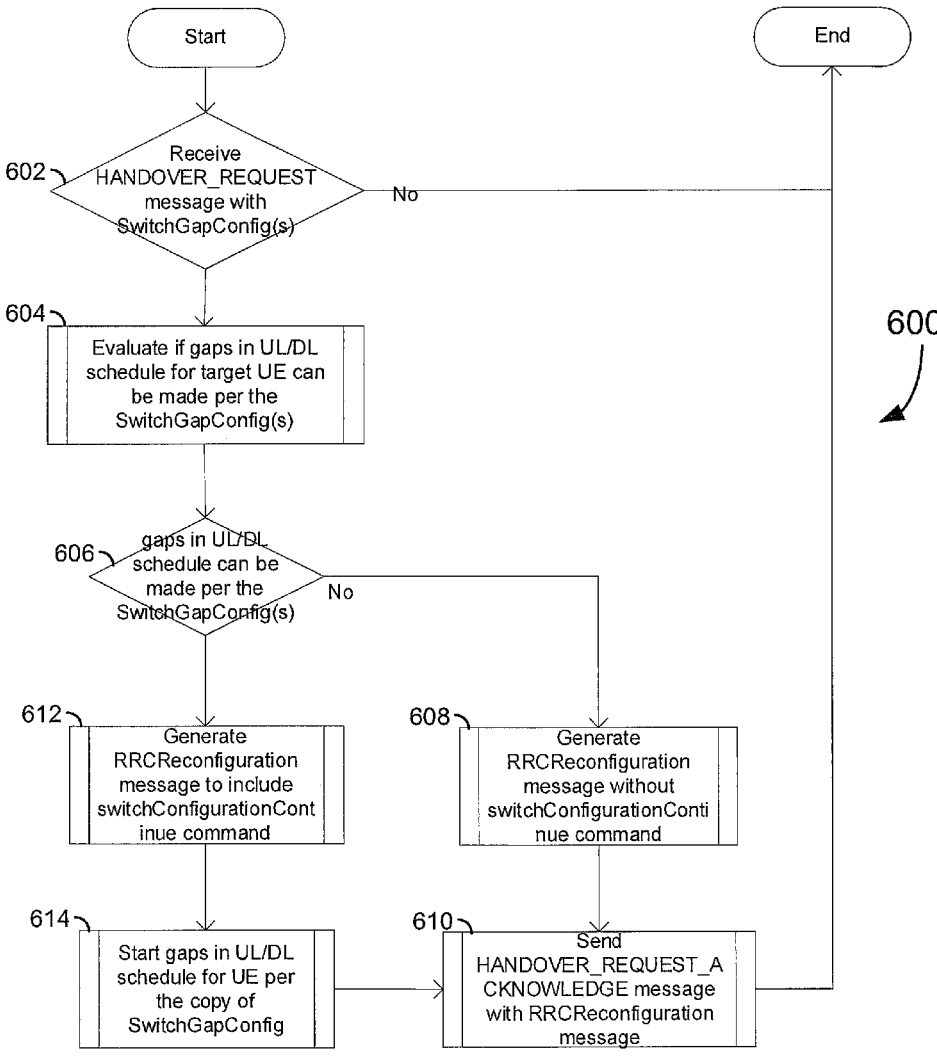
FIG. 6 illustrates a flow diagram of a method for a target gNB to facilitate a continuation of a switching procedure during and after a handover procedure, according to an example implementation of the present disclosure.

FIG. 6 illustrates a flow diagram of a method 600 for a target gNB to facilitate a continuation of a switching procedure during and after a handover procedure, according to an example implementation of the present disclosure. In method 600, at operation 602, the target gNB may receive, from a source gNB, a HANDOVER-REQUEST message to hand over a UE, where one or more switch gap configurations may be transported with the HANDOVER-REQUEST message. In some implementations the reception of the HANDOVER-REQUEST message may correspond to operation 506 of FIG. 5.

At operation 604, the target gNB may evaluate whether the target gNB may create gaps in the UL/DL schedule for the UE in accordance with the one or more switch gap configurations. If the target gNB is capable of creating the requested gaps in the UL/DL schedule for the UE, method 600 may proceed to operation 612. At operation 612, the target gNB may generate an RRCReconfiguration message that includes a switchConfigurationContinue command that is set to TRUE. At operation 614, the target gNB may create the requested gaps in the UL/DL schedule for the UE, as indicated in the received copy of the one or more switch gap configurations. Further, at operation 610, the target gNB may transmit, to the source gNB in response to the HANDOVER-REQUEST message, a HANDOVER-REQUEST-ACKNOWLEDGE message that includes the generated RRCReconfiguration message. Thereafter, method 600 may terminate.

If, instead, the target gNB is incapable of creating the requested gaps in the UL/DL schedule for the UE, method 600 may proceed from operation 606 to operation 608. At operation 608, the target gNB may generate an RRCReconfiguration message that does not include a switchConfigurationContinue command. Alternately at operation 608, in some implementations, the target gNB may generate an RRCReconfiguration message that includes a switchConfigurationContinue command that is set to FALSE. Further, at operation 610, the target gNB may transmit, to the source gNB in response to the HANDOVER-REQUEST message, a HANDOVER-REQUEST-ACKNOWLEDGE message that includes the generated RRCReconfiguration message, after which method 600 may terminate.

FIG. 7 illustrates an example of a new Other Configuration (otherConfig) information element (IE), according to an example implementation of the present disclosure. As depicted in FIG. 7, the otherConfig IE may include a new command, switchConfiguationContinue (indicated in bold font in FIG. 7). In some implementations, the otherConfig IE is intended to be carried by the RRCReconfiguration message for triggering a handover of the UE from a source gNB of a first network to the target gNB of the first network. As described above, the switchConfigurationContinue command, when transported from the source gNB to the UE, may enable the switching procedure of the UE to continue to use the currently-jointly-in-use one or more switch gap configurations to determine opportunities when the UE may Switch Without Leaving the target gNB or the source gNB to receive paging and other information from a gNB of a second network during and after the handover procedure.

Figure 8A:
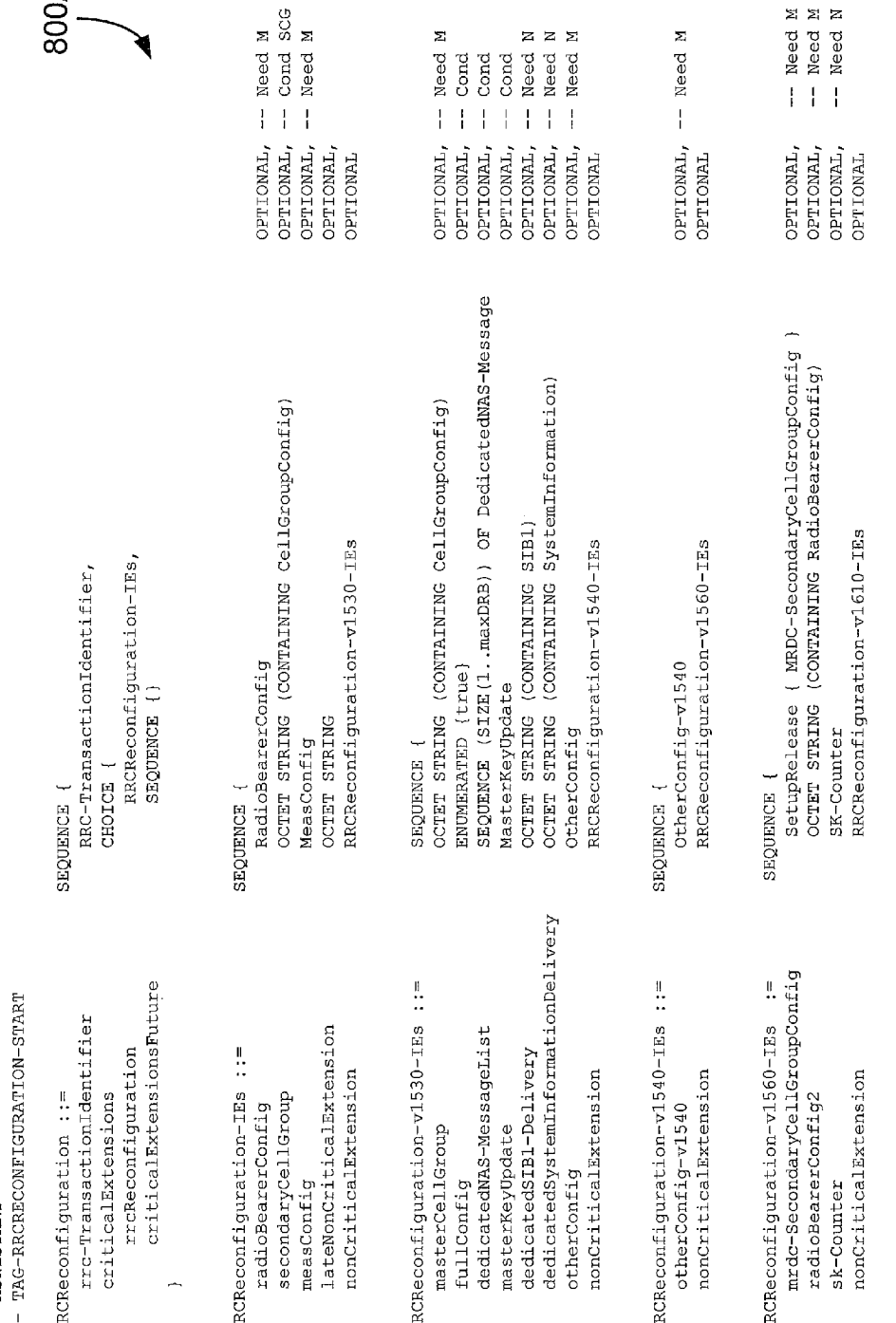
FIG. 8A illustrates an example of a new RRC Reconfiguration (RRCReconfiguration) IE, according to an example implementation of the present disclosure.

FIGS. 8A and 8B illustrate an example of a new RRC Reconfiguration (RRCReconfiguration) IE, according to an example implementation of the present application. In some implementations, the new RRCReconfiguration IE that includes the switchConfiguationContinue command via the new otherConfig IE, as indicated in FIG. 7, is illustrated in bold font in FIG. 8B. Generally, the RRCReconfiguration message may modify an RRC connection. In some implementations, the RRCReconfiguration message may convey information for measurement configuration, mobility control, radio resource configuration (e.g., including Resource Blocks (RBs), Media Access Control (MAC) main configuration, and physical (PHY) channel configuration), Access Stratum (AS) security configuration, and so on.

The following example describes what operations the NR UE may perform upon reception of an RRCReconfiguration message with an otherConfig message that includes a new IE switchConfigurationContinue-r17, as an addition to the existing text in TS 38.331 (e.g., at Sections 5.3.5.3 and 5.3.5.9, with reference to Conditional Handover (CHO) and Conditional Primary Secondary Cell (PSCell) Change (CPC)):

5.3.5.3 Upon receiving of the RRCReconfiguration, or upon execution of the conditional reconfiguration (CHO or CPC):
1> if the RRCReconfiguration is applied due to a conditional reconfiguration execution upon cell selection performed while timer T311 was running, as defined in 5.3.7.3:
2> remove all the entries within VarConditionalReconfig, if any,
( . . . Text removed for brevity . . . )
1> if the RRCReconfiguration message includes the otherConfig:
2> perform the other configuration procedure as specified in 5.3.5.9;
( . . . Remaining text of 5.3.5.3 removed for brevity . . .
)
5.3.5.9 Other configuration
The UE shall:
1> if the received otherConfig includes the delayBudgetReportingConfig:
2> if delayBudgetReportingConfig is set to setup:

3> consider itself to be configured to send delay budget reports in accordance with 5.7.4;

2> else:

3> consider itself not to be configured to send delay budget reports and stop timer T342, if running.

1> if the received otherConfig includes the switchConfigurationContinue:

2> consider itself to be configured to continue to the use switchGapConfig during and after handover;

1> else:

2> consider itself to be configured to not continue to the use switchGapConfig during and after handover;

( . . . Remaining text of 5.3.5.9 removed for brevity . . . )

What is claimed is:

1. A user equipment (UE), comprising:

one or more non-transitory computer-readable media having computer-executable instructions embodied thereon; and at least one processor coupled to the one or more non-transitory computer-readable media and configured to execute the computer-executable instructions to:

while maintaining a first Radio Resource Control (RRC) connection with a first base station (BS) of a first network, receive transmissions from a BS of a second network during at least one time period specified in a switch gap configuration;

receive an RRC reconfiguration message from the first BS of the first network, the RRC reconfiguration message comprising a first command and a second command, the first command instructing the UE to begin a handover procedure from the first BS of the first network to a second BS of the first network, and the second command controlling usage of the switch gap configuration by the UE in association with the handover procedure;

initiate execution of the handover procedure according to the first command; and after initiating execution of the handover procedure, where the second command enables continued usage of the switch gap configuration, continue to receive transmissions from the BS of the second network during the at least one time period specified in the switch gap configuration.

2. The UE of claim 1, wherein the at least one processor is further configured to execute the computer-executable instructions to:

where the second command disables continued usage of the switch gap configuration, cease to receive transmissions from the BS of the second network.

3. The UE of claim 1, wherein the first command comprises the second command.

4. The UE of claim 1, wherein the RRC reconfiguration message comprises an RRCReconfiguration message.

5. The UE of claim 4, wherein:

the second command comprises a switchConfigurationContinue command; and the RRCReconfiguration message comprises the switchConfigurationContinue command.

6. The UE of claim 5, wherein the RRCReconfiguration message comprises an OtherConfig information element (IE) comprising the switchConfigurationContinue command.

7. The UE of claim 1, wherein the at least one processor is further configured to execute the computer-executable instructions to:

receive the switch gap configuration from one of a plurality of BSes of the first network.

8. The UE of claim 1, further comprising receiving an RRCReconfiguration message comprising a switchGapConfig IE comprising the switch gap configuration.

9. The UE of claim 8, wherein the RRCReconfiguration message comprises an OtherConfig IE comprising the switchGapConfig IE.

10. A base station (BS) of a first network, the BS comprising:

one or more non-transitory computer-readable media having computer-executable instructions embodied thereon; and at least one processor coupled to the one or more non-transitory computer-readable media and configured to execute the computer-executable instructions to:

maintain a first Radio Resource Control (RRC) connection with a user equipment (UE) while facilitating gaps in communication with the UE according to a switch gap configuration;

transmit, to another BS of the first network, a handover request message comprising the switch gap configuration;

receive, from the other BS of the first network, a handover request acknowledgment message comprising an RRC reconfiguration message, the RRC reconfiguration message comprising a first command and a second command, the first command instructing the UE to begin a handover procedure from the BS of the first network to the other BS of the first network, and the second command controlling usage of the switch gap configuration by the UE in association with the handover procedure; and transmit, to the UE, the RRC reconfiguration message.

11. The BS of claim 10, wherein the handover request message comprises a Source-To-Target-Transparent-Container comprising the switch gap configuration.

12. The BS of claim 10, wherein the handover request acknowledgment message comprises an RRCReconfiguration message comprising the first command and the second command.

13. A base station (BS) of a first network, the BS comprising:

one or more non-transitory computer-readable media having computer-executable instructions embodied thereon; and at least one processor coupled to the one or more non-transitory computer-readable media and configured to execute the computer-executable instructions to:

receive, from another BS of the first network, a handover request message for a user equipment (UE), the handover request message comprising a switch gap configuration that specifies at least one time period during which the UE receives transmissions from a BS of a second network;

determine whether the BS of the first network is capable of providing the at least one time period to facilitate receiving, by the UE, the transmissions from the BS of the second network;

generate an RRC reconfiguration message comprising a first command and a second command, the first command instructing the UE to begin a handover procedure from the other BS of the first network to the BS of the first network, and the second command controlling usage of the switch gap configuration by the UE in association with the handover procedure based on whether the BS of the first network is capable of providing the at least one time period; and transmit, to the other BS, a handover request acknowledgment message comprising the RRC reconfiguration message.

14. The BS of claim 13, wherein the handover request message comprises a Source-To-Target-Transparent-Container comprising the switch gap configuration.

15. The BS of claim 13, wherein the handover request acknowledgment message comprises an RRCReconfiguration message comprising the first command and the second command.

* * * * *